United States Patent [19]

Smith

[11] Patent Number: 5,775,282

[45] Date of Patent: Jul. 7, 1998

[54] AUXILIARY INJECTOR

[75] Inventor: Rodney Sinclair Smith, South Australia, Australia

[73] Assignee: The Energy Research and Development Corporation, Turner, Australia

[21] Appl. No.: 765,085

[22] PCT Filed: Jun. 21, 1995

[86] PCT No.: PCT/AU95/00367

§ 371 Date: Dec. 20, 1996

§ 102(e) Date: Dec. 20, 1996

[87] PCT Pub. No.: WO95/35441

PCT Pub. Date: Dec. 28, 1995

[30] Foreign Application Priority Data

Jun. 21, 1994 [AU] Australia .................. PM6324

[51] Int. Cl.⁶ .................................................. F02N 17/00
[52] U.S. Cl. ..................... 123/179.8; 123/525; 123/576
[58] Field of Search ................................. 123/525, 526, 123/527, 529, 575, 577, 578, 576, 516, 179.8

[56] References Cited

U.S. PATENT DOCUMENTS 5,203,305  4/1993  Porter et al. ................. 123/575
5,549,083  8/1996  Feuling ........................ 123/576

FOREIGN PATENT DOCUMENTS

| 30 07 664 | 9/1981 | Germany | 123/525 |
| 5-99075 | 4/1993 | Japan | 123/575 |
| 2 014 336 | 8/1979 | United Kingdom . | |
| 81/00282 | 2/1981 | WIPO . | |
| 89/00640 | 1/1989 | WIPO . | |

OTHER PUBLICATIONS

Derwent Abstract Accession No. 86-263582/40, Class Q53, SU1211435A, 15 Feb. 1986.

*Primary Examiner*—Erick R. Solis
*Attorney, Agent, or Firm*—Evenson McKeown Edwards & Lenahan PLLC

[57] ABSTRACT

An auxiliary injector arrangement in a fuel supply system for an internal combustion engine. The auxiliary injector arrangement includes at least one injector mounted in the inlet manifold upstream or downstream of the throttle and adapted to supply fuel at times when the main fuel supply system cannot supply sufficient fuel. The main fuel supply system and the auxiliary injector may be operated on LPG, natural gas or petrol. The auxiliary injector may be a liquid fuel injector or gaseous fuel injector.

8 Claims, 3 Drawing Sheets

AUXILIARY INJECTOR

TECHNICAL FIELD

This invention relates to fuel injection systems for internal combustion engines.

BACKGROUND ART

Fuel injection systems for internal combustion engines can be adapted to supply liquid fuels to the inlet manifold for each cylinder of the engine. This system is known as multi-point liquid fuel injection. By suitable control of the operation of the injectors accurate amounts of liquid fuel can be supplied directly to each cylinder depending upon engine conditions and demand characteristics for vaporisation and combustion in the cylinder.

There is a problem in that for liquid fuel injection to be accurate the fuel in the injectors adjacent the injection point must be liquid at all times. The environment around each cylinder, however, can at times during engine operation be very hot and such a temperature in this region is not conducive to injection of a liquid fuel which has a low boiling point.

One particular time in which serious problems can occur is when an engine has been turned off for some time after running and the fuel rails, body of the inlet manifold and the injector or injectors have heated considerably to the stage that the liquid fuel in the injectors and even in the fuel rails has vaporised so that the rails are full of gaseous fuel rather than liquid fuel. This condition may be known as heat soak conditions. When it is desired to restart such an engine, the injectors which are designed to supply pressurised liquid will not supply sufficient fuel in the form of a gas and such an engine cannot easily be started. Operation of a fuel pump to circulate fresh fuel through the fuel rails and injectors is necessary for some considerable time, perhaps 15 or 30 seconds, before sufficient fresh fuel has been pumped into the fuel rail and injectors to cool them and to supply liquid fuel to the injectors to enable starting of the engine.

Another problem can exist where an engine is operated on a dual fuel system. That is, the engine has perhaps both a LPG and a petrol supply and is desired to change from one fuel to the other. Where the change is from petrol to LPG the much higher pressure LPG easily replaces the petrol but when the change is from LPG at a higher pressure to petrol at a lower pressure there is a considerable time, perhaps in the order of two minutes, where the pressure is still too high to admit petrol but the LPG pressure is not maintained because of lack of flow of LPG and hence is not high enough to prevent vaporisation of the fuel and again gas rather than liquid is supplied through the injectors.

It is the object of this invention to provide an arrangement by which an engine can be started in what may be termed heat soak conditions and also to provide arrangements where power can be maintained during changeover from one fuel to another in a dual fuel system.

DISCLOSURE OF THE INVENTION

In one form therefore the invention is said to reside in an auxiliary injector arrangement in a dual fuel supply system for an internal combustion engine, the dual fuel supply system comprising a main fuel supply system to supply at least one of the fuels using a main liquid fuel injector or injectors into at least an inlet manifold adjacent each engine cylinder of the engine, and an auxiliary fuel supply system, wherein the inlet manifold includes a throttle body and the inlet manifold is divided downstream of the throttle body to supply air to each of the cylinders of the internal combustion engine, the auxiliary fuel supply system including at least one injector for one of the fuels mounted in or adjacent the throttle body upstream or downstream of a throttle valve in the throttle body and adapted to supply fuel at times when the main injector or injectors cannot supply sufficient fuel.

Hence it will be seen by this invention that there is provided an auxiliary fuel injector located in the main inlet air stream at a point some distance from the engine block, where temperatures are not so harsh, as an alternative fuel supply system.

Because of its positioning adjacent the throttle the auxiliary injector may be called a throttle body injector.

In one preferred embodiment the main fuel supply system may be a multi-point fuel injection arrangement and there may be individual injectors for each cylinder operating on petrol, LNG, CNG or LPG. Alternatively the fuel supply system may be a single injector system operating on petrol, LNG, CNG or LPG.

The fuel for both the main fuel supply system and the auxiliary injector of this invention may be a single fuel vehicle which may be LPG, natural gas or petrol or some other fuel.

Alternatively the invention may be applied to a dual fuel vehicle such as one which is operating on petrol and LPG or any other two fuels. In the dual fuel system the auxiliary injector may be supplied with petrol or LPG.

The auxiliary injector when it is operated on LPG or natural gas may be either a liquid fuel injector or a gaseous fuel injector.

If the auxiliary injector is operated on LPG or LNG as a gaseous fuel injector the source of gas may be a vaporiser/regulator arrangement supplied with liquid fuel from the fuel tank.

Alternatively the gaseous fuel may be obtained directly from the vapour space in the top of the LPG or CNG fuel tank. Such a gas will be at the vapour pressure of the fuel in the tank and this pressure will be sufficient to enable supply as a gas to the injector and may need throttling back before supply to the auxiliary injector. It may be necessary to use a pressure regulator on the vapour supply line to the auxiliary injector.

When injecting through the auxiliary injector in either the liquid or gaseous state the quantity can be determined by determination of the pressure or pressure and temperature and the use of suitable look-up tables in an electronic controller for the engine.

As discussed above the auxiliary injector is used in a first circumstance when the temperature or pressure or both in individual injectors is such that it is likely that fuel has vaporised in the injectors. That is, there are some form of heat soak conditions which are being caused by a hot engine.

The other circumstance in which the auxiliary injector may be used is in a dual fuel engine when changing over from a higher pressure fuel to a lower pressure fuel.

The auxiliary injector arrangement for liquid fuel may use one or two injectors and these injectors may be angled to the direction of elongation of the inlet manifold to direct fuel towards the throttle when mounted before the throttle and directed at a baffle plate when mounted after the throttle to in each case provide good mixing and vaporisation of the fuel.

In one particular embodiment there may be both LPG and petrol supplied to the auxiliary injector with suitable valving to ensure only one of the fuels can be supplied at a time so that if the dual fuel engine has no petrol at all then it can still be operated on LPG even in heat soak conditions.

Where an auxiliary injector arrangement according to this invention is to be installed into a vehicle at time of manufacture a suitable construction of the throttle body may be provided to include a mounting arrangement for the one or more auxiliary injectors and a suitable fuel supply from the fuel supply line for the engine.

Where the auxiliary injector is to be installed into a motor vehicle at the time of change over from a single fuel injection engine to a dual fuel injection engine there may be provided an adaptor ring which is fitted into the throttle inlet pipe from the air cleaner and the injector may be mounted into the adaptor ring. Once again a suitable supply can be provided from either the petrol supply line or the LPG supply line.

Suitable electronic control means may be provided in the vehicles electronic control unit to provide for actuation of the auxiliary injector at required times.

The invention therefore provides an auxiliary fuel supply which can be an injector located on a throttle body adaptor upstream or downstream of the throttle body of an internal combustion engine. The injector may be a standard petrol injector with relatively high flow configuration to cover as high loads and engine speeds as possible. Its housing may be designed so that the spray of the injector is directed towards the throttle valve. This will assist in vaporising petrol which is important to achieve relatively good fuel distribution into each cylinder.

When heat soak conditions of the engine are detected the vehicle's electronic control unit will energise the throttle body injector or auxiliary injector operating on petrol by calculating the necessary fuel requirements and considering the amount of fuel for a single injector only. If necessary, two throttle body injectors or auxiliary injectors can be used to cover a wider operating range. This arrangement will assist in providing fuel to the engine and starting it running. At the same time as operating the auxiliary injector, LPG or petrol fuel pumps can be operated to recirculate fuel to cool the injectors and fuel rails of the main injection system but the actual injectors are not energised during this period.

When the electronic control unit receives a signal that indicates that there is no more vaporisation due to cooling of the recirculation fluid or a predetermined time has elapsed the throttle body injector can be stopped and multi-point petrol LNG, or LPG operation can be used.

During the period that the auxiliary injector may be running which may be up two minutes there may be some loss of power due to the limited fuel delivery through one injector. Two injectors may be used, however, to overcome any power loss during that period.

The throttle body injector may only be used when a heat soak condition is detected or in a dual fuel engine upon change over from a higher pressure fuel to a lower pressure fuel. When an engine is cold or there is no heat soak conditions cranking and running will be as normal with the main or multi-point injectors.

The auxiliary injector may also be used to assist the changeover from a high pressure fuel such as LPG to a lower pressure fuel such as petrol. During changeover the auxiliary injector is running on petrol simultaneously with the multi-point injectors to bleed the vapour of LPG into the inlet manifold. The electronic control unit may adjust the fuel injection in the throttle body injector or auxiliary injector and the multi-point LPG injectors by monitoring the feedback from the exhaust oxygen sensor. Care is taken so that the purging of LPG is done as quickly as possible by reducing the amount of fuel from the throttle body injector and achieving a relatively fast changeover. During the changeover period the pressure in the fuel rail is monitored continuously so when the pressure drops close to the petrol pressure it will switch to petrol multi-point injection and the throttle body injector will be switched off.

Hence in an alternative form the invention may be said to reside in a method of operating a fuel supply system for an internal combustion engine comprising a main fuel supply system and an auxiliary fuel supply system including the steps of determining times when the main fuel supply system is unlikely to be or is not delivering sufficient fuel for efficient operation of the engine and injecting fuel into an inlet manifold of the engine at a point remote from the engine by the use of the auxiliary fuel supply system which includes an auxiliary injector as discussed above.

This then generally describes the invention, but to assist with understanding the invention reference will now be made to the accompanying drawings which show preferred embodiments of the invention.

BEST MODE FOR CARRYING OUT THE INVENTION

Figure 1:
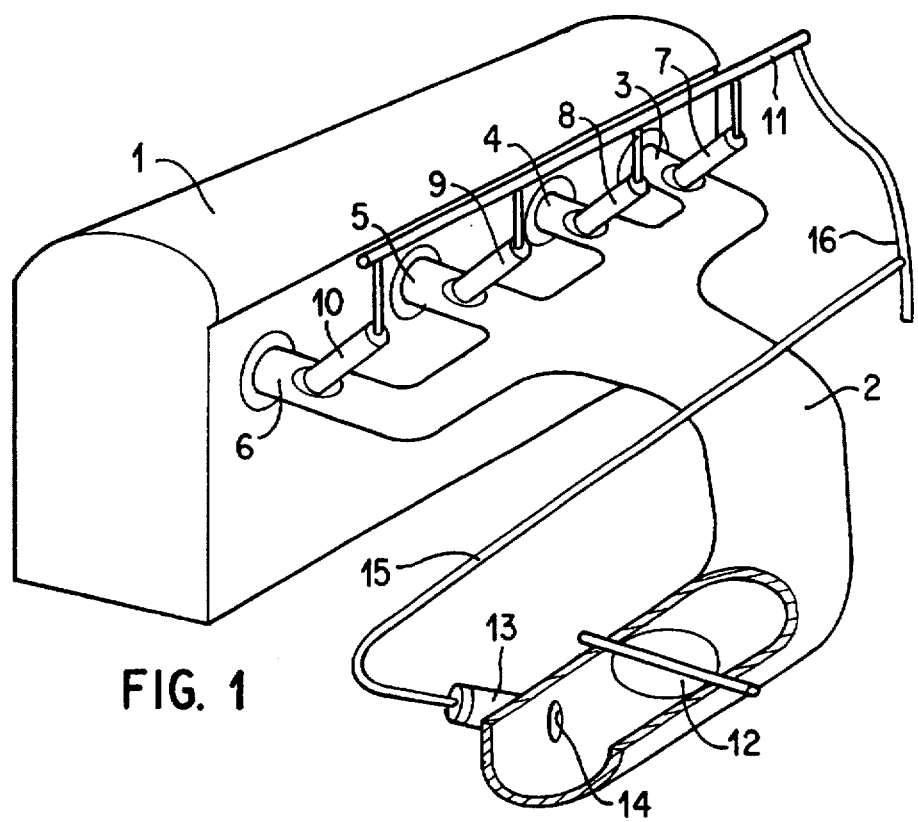
FIG. 1 shows a schematic view of a fuel injection arrangement according to this invention using a single fuel.

Now looking more closely at the drawings and in particular FIG. 1 it will be seen that an engine 1 shown schematically has an inlet manifold 2 which is divided into individual inlet ducts 3, 4, 5 and 6, one for each cylinder. Fuel injectors 7, 8, 9 and 10 supply fuel from a fuel rail 11 into each injector. The fuel may be petrol or LPG. Electrical wiring (not shown) from an electronic controller (not shown) is provided to actuate the injectors as required. Also not shown is a return line from the injectors and rail to the fuel tank.

The inlet manifold 2 includes a throttle valve 12 and upstream of the throttle valve 12 there is an auxiliary injector 13 which is supplied with fuel by line 15 from a supply line 16 which provides fuel to the fuel rail 11. The auxiliary injector 13 has a nozzle 14 directed into the inlet manifold 2 upstream of the throttle valve 12. The auxiliary injector 13 is also actuated by the electronic controller.

It will be noted that the position of the auxiliary injector 13 upstream of the throttle valve 12 is somewhat remote from the engine 1 and therefore is not so subject to the very high heating conditions which can occur on the individual inlets 3, 4, 5 and 6. For this reason even if fuel has vaporised in the injectors 7, 8, 9 and 10 and even in the rail 11 liquid fuel can still be provided through the auxiliary injector 13 to enable starting of the engine in hot conditions.

Once the engine has been started using the auxiliary injector then sufficient fuel can be circulated through the injectors 7, 8, 9 and 10 to cool them or the injectors can be operated to purge gas from them and supply liquid fuel. Once the main multi-point injectors are operating correctly then the auxiliary injector is stopped.

Figure 2:
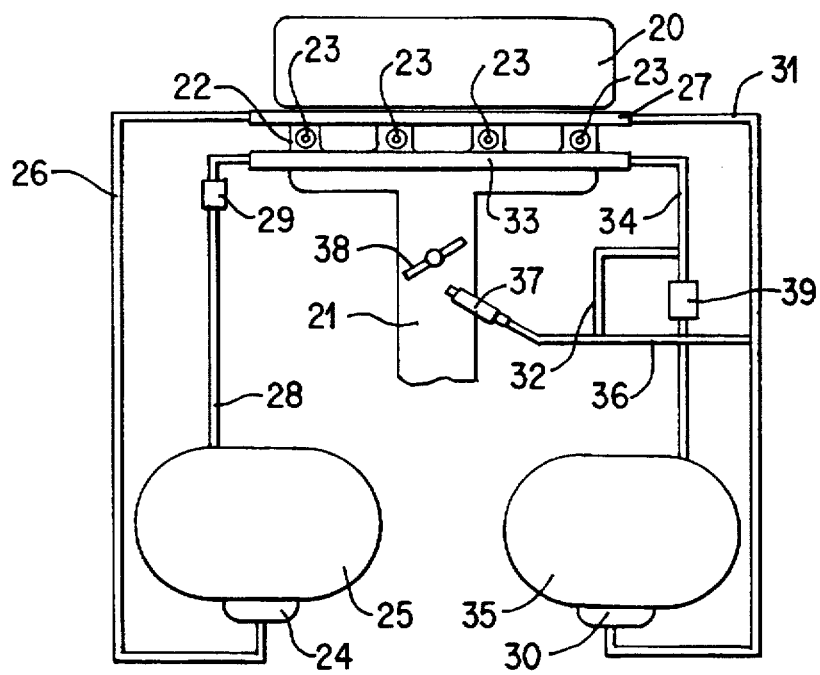
FIG. 2 shows a dual fuel injection arrangement including an auxiliary injector of the present invention.

FIG. 2 shows a schematic arrangement of a dual fuel engine operating on LPG and petrol and using an auxiliary injector according to this invention. The engine 20 has a inlet manifold 21 which is divided into four individual manifolds 22 each of which supply air to a cylinder in this case a four cylinder engine. Injectors 23 supply fuel as required to each individual inlet duct so that it can get into individual cylinders. During normal operation on either LPG or petrol excess fuel is recirculated through an inlet fuel rail 27, the injectors 23 and an outlet fuel rail 33 to maintain cooling of the injectors 23. In the case of LPG, LPG pump 24 pumps fuel from the tank 25 through LPG feed line 26 into the inlet fuel rail 27 and through each of the injectors with the excess fuel passing through the outlet fuel rail 33 and the pressure regulator 29 and back through LPG return line 28 to the LPG tank. Similarly with petrol operation, petrol pump 30 pumps fuel through petrol feed line 31 from the tank 35 to the inlet fuel rail 27 and through the injectors 23 and out through the outlet fuel rail 33 and through the petrol return line 34 to the petrol tank 35. A petrol pressure regulator 39 in the return line 34 controls the pressure in the petrol circuit.

A petrol feed line 36 from the main petrol feed line 31 supplies an auxiliary injector 37 in the inlet manifold 21 upstream of the throttle valve 38. A branch line 32 from the petrol feed line 36 to the petrol return line 34 upstream of the regulator 39 controls the pressure in the auxiliary injector feed line.

Figure 3:
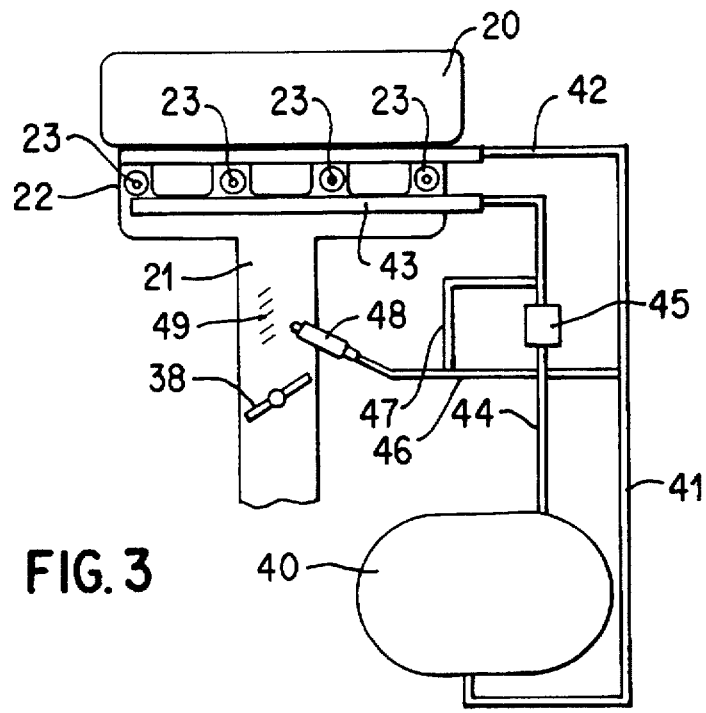
FIG. 3 shows a single fuel injection arrangement including an auxiliary injector of the present invention.

FIG. 3 shows an arrangement of a single fuel engine operating on a high boiling point fuel such as petrol.

In this drawing the same reference numerals are used as in FIG. 2 for the common components.

The high boiling fuel such as petrol is stored in a tank 40 and is supplied to the inlet fuel rail 42 by means of fuel supply line 41. After flowing through each of the injectors excess fuel passes out through outlet rail 43 and outlet fuel line 44 back to the tank 40. A petrol pressure regulator 49 in the return line 44 controls the pressure in the petrol circuit.

A petrol feed line 46 from the main petrol feed line 41 supplies an auxiliary injector 48 which is downstream of the throttle 38 in the inlet manifold 21. A branch line 47 from the petrol feed line 46 to the petrol return line 44 upstream of the regulator 49 controls the pressure in the auxiliary injector feed line.

At times where there are heat soak conditions in the engine and the injectors 23 cannot supply sufficient fuel through the inlet pipes 22 to the engine then the auxiliary injector 48 may be used to supply sufficient fuel.

A baffle 49 may be provided to efficiently disperse the injected fuel from the injector 48.

Figure 4:
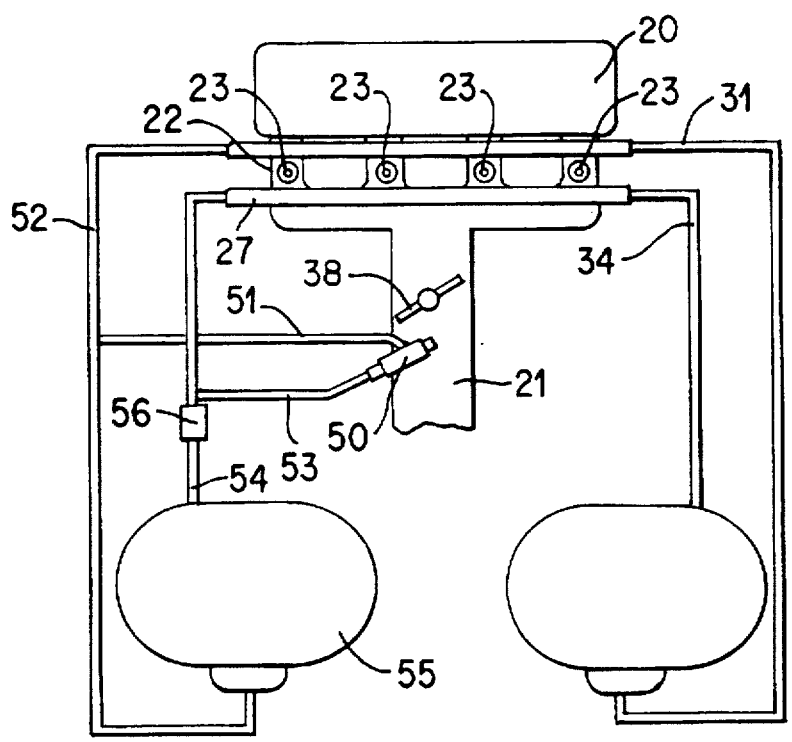
FIG. 4 shows an alternative dual fuel injection arrangement including an auxiliary injector of the present invention.

FIG. 4 shows a dual fuel engine in which the auxiliary injector 50 is a flow through type injector supplied on fuel line 51 from fuel supply line 52 with excess fuel passing through fuel return line 53 to main fuel return line 54 and pressure regulator 56 into the fuel tank 55.

In this embodiment the injector 50 is upstream of the throttle 38 in the inlet manifold 21.

Figure 5:
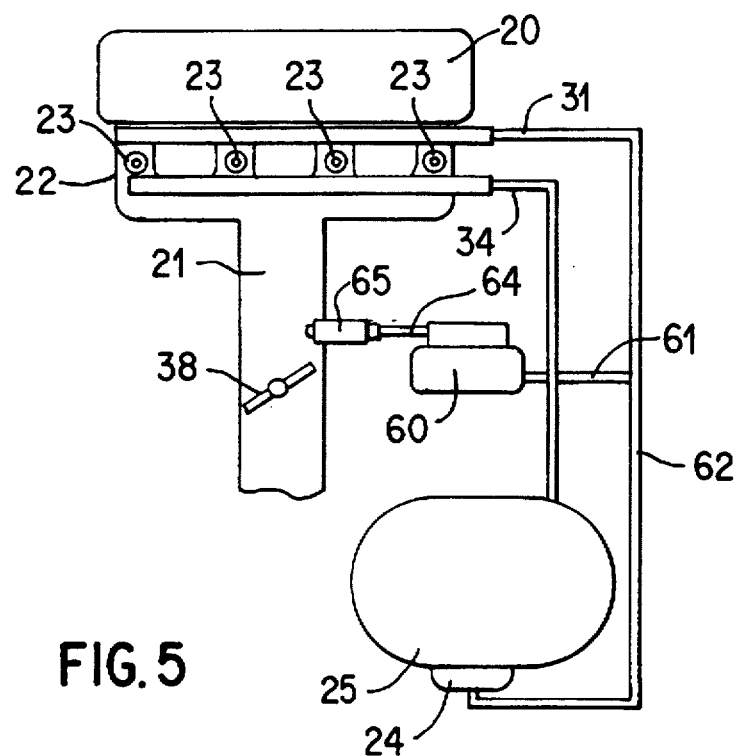
FIG. 5 shows a single fuel injection arrangement including an auxiliary injector of the present invention utilising a mixer-vaporiser.

FIG. 5 shows an embodiment of LPG or LNG fuelled vehicle which uses a vaporiser/regulator 60 to vaporise liquid fuel supplied by line 61 from main fuel line 62 and then to supply gas through line 64 to gas injector 65.

The gas injector 65 is downstream from the throttle 38 in the inlet manifold 21.

Figure 6:
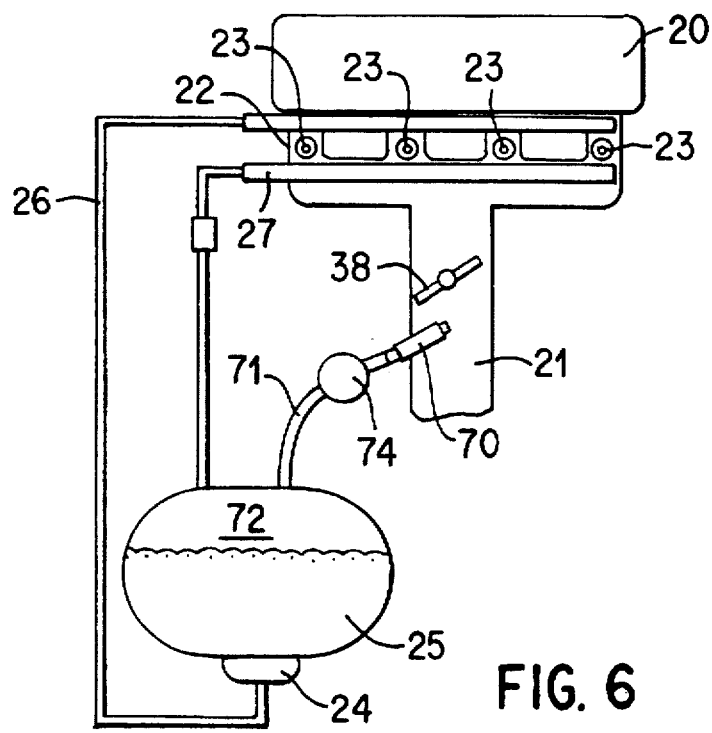
FIG. 6 shows a single fuel injection arrangement including an auxiliary injector of the present invention utilising vapour direct from the fuel tank.

FIG. 6 shows an embodiment of a LPG or LNG fuelled engine in which the auxiliary injector 70 is a gas type injector and is supplied by fuel from the gas line 71 which extends directly from the vapour space 72 above the fuel in the fuel tank 25.

As there is gas in the vapour space 72 of the tank 25 in equilibrium with the liquid in the tank there would be sufficient gas pressure to supply gas to the injector 70. Optionally there may be a pressure regulator 74 in the gas supply line 71.

It will be seen that by this invention there is provided an arrangement whereby use of the an auxiliary injector in the throttle body of an internal combustion engine gives easier hot start and fuel changeover conditions.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

I claim:

1. An auxiliary injector arrangement in a dual fuel supply system for an internal combustion engine, the dual fuel supply system comprising a main fuel supply system to supply at least a first fuel using at least one main liquid fuel injector into at least an inlet manifold adjacent each engine cylinder of the engine, and an auxiliary fuel supply system, wherein:

the inlet manifold includes a throttle body;

the inlet manifold is divided downstream of the throttle body to supply air to each of the cylinders of the internal combustion engine;

the auxiliary fuel supply system includes at least one injector for a second fuel, mounted in or adjacent the throttle body upstream or downstream of a throttle valve in the throttle body, and adapted to supply said second fuel at times when the at least one main injector cannot supply a sufficient amount of said first fuel; and the second fuel, supplied by the auxiliary injector, is petrol.

2. An auxiliary injector arrangement as in claim 1 wherein the main fuel supply system is a multi-point fuel injection arrangement and there are individual injectors for each cylinder operating on petrol and LPG as the dual fuels.

3. An auxiliary injector arrangement as in claim 1 wherein the engine is a dual fuel engine and is supplied with petrol and LPG and the auxiliary injector is supplied with petrol.

4. An auxiliary injector arrangement as in claim 1 wherein the auxiliary injector is a liquid fuel injector.

5. An auxiliary injector arrangement as in claim 1 wherein the auxiliary injector arrangement comprises one to two top feed injectors.

6. An auxiliary injector arrangement as in claim 1 including electronic control means to provide for actuation of the auxiliary injector at required times.

7. A method of operating a fuel supply system and an internal combustion engine comprising a main fuel supply system and an auxiliary fuel supply system including the steps of determining times when the main fuel supply system is unlikely to be or is not delivering sufficient fuel for efficient operation of the engine and injecting fuel into an inlet manifold of the engine at a point remote from the engine by use of the auxiliary fuel supply system including an auxiliary injector arrangement as defined in claim 1.

8. A method of operating a fuel supply system for an internal combustion engine as in claim 7 including the step of determining the correct quantity of fuel for the auxiliary injector arrangement by determination of the pressure or pressure and temperature of the fuel and using of suitable look-up tables in an electronic controller for the engine.

* * * * *